US007486975B2

(12) United States Patent
Mori

(10) Patent No.: US 7,486,975 B2
(45) Date of Patent: Feb. 3, 2009

(54) ANTENNA DEVICE

(75) Inventor: Kohei Mori, Kanagawa (JP)

(73) Assignee: Sony Corporation (JP)

(*) Notice: Subject to any disclaimer, the term of this patent is extended or adjusted under 35 U.S.C. 154(b) by 915 days.

(21) Appl. No.: 10/871,016

(22) Filed: Jun. 21, 2004

(65) Prior Publication Data

US 2005/0009586 A1 Jan. 13, 2005

(30) Foreign Application Priority Data

Jul. 10, 2003 (JP) ........................... P2003-195007

(51) Int. Cl.
*H04Q 7/32* (2006.01)

(52) U.S. Cl. .............. 455/575.7; 455/575.1; 455/550.1; 455/90.1; 455/90.3; 455/553.1; 343/700 R; 343/702; 343/718; 343/725; 343/729

(58) Field of Classification Search .............. 455/575.7, 455/575.1, 550.1, 90.1, 90.2, 90.3, 553.1, 455/422.1, 500, 403, 423-425, 67.11; 343/700, 343/702, 718, 725, 729, 752, 761, 762, 832, 343/835, 837, 839, 844
See application file for complete search history.

(56) References Cited

U.S. PATENT DOCUMENTS 5,649,306 A 7/1997 Vannatta et al.
6,757,267 B1 * 6/2004 Evans et al. ................. 370/334
7,190,313 B2 * 3/2007 Chiang et al. ............... 343/702
2001/0016477 A1 8/2001 Harano

FOREIGN PATENT DOCUMENTS

| | | | |
|---|---|---|---|
| JP | 8265235 | * | 11/1996 |
| JP | 10-285093 | | 10/1998 |
| JP | 2002952150 A | * | 11/2000 |
| JP | 2001-024431 | | 1/2001 |
| JP | 2001-230709 | | 8/2001 |
| JP | 2003-188630 | | 7/2003 |

OTHER PUBLICATIONS

EPO Search Report dated Aug. 30, 2004.
Office Action from Japanese Patent Office issued on Sep. 26, 2006 for patent application JP 2003-195007.

* cited by examiner

*Primary Examiner*—Keith T Ferguson
(74) *Attorney, Agent, or Firm*—Rader Fishman & Grauer PLLC; Ronald P. Kananen

(57) ABSTRACT

An antenna device includes a plurality of radiation elements, at least one or more reactance elements, and a changeover switcher for selectively switching over between one circuit pattern forming a first-type antenna such as a diversity antenna where a predetermined one of the plural radiation elements is used as a feed element, and another circuit pattern forming a second-type antenna such as an ESPAR antenna where one of the plural radiation elements is used as a feed element while the reactance elements are connected to the other radiation element. According to this antenna device, the receiving sensitivity can be improved by using a reduced number of radiation elements in a mobile communication apparatus such as a cellular telephone.

8 Claims, 7 Drawing Sheets

| | SW1 | SW2 |
|---|---|---|
| DIVERSITY ANTENNA 1 | A | B |
| DIVERSITY ANTENNA 2 | B | B |
| ESPAR ANTENNA | A | A |

| | SW1 | SW2 | SW3 |
|---|---|---|---|
| DIVERSITY ANTENNA 1 | A | B | B |
| DIVERSITY ANTENNA 2 | B | B | B |
| ESPAR ANTENNA 1 | A | A | B |
| ESPAR ANTENNA 2 | B | B | A |

| | SW2 | SW3 |
|---|---|---|
| ESPAR ANTENNA 1 | A | B |
| ESPAR ANTENNA 2 | B | A |
| ARRAY ANTENNA | B | B |

| | SW1 | SW2 | SW3 | SW4 |
|---|---|---|---|---|
| DIVERSITY ANTENNA 1 | A | B | C | – |
| DIVERSITY ANTENNA 2 | B | B | C | – |
| ESPAR ANTENNA 1 | A | A | C | – |
| ESPAR ANTENNA 2 | – | C | A | A |
| ARRAY ANTENNA | A | C | C | A |

ANTENNA DEVICE

BACKGROUND OF THE INVENTION

The present invention relates to an antenna device and, more particularly, to an improved device adapted for attaining a sufficiently high receiving sensitivity in a mobile communication apparatus or the like.

In a mobile communication apparatus, it has been demanded heretofore the achievement of a capability of receiving a desired wave signal from any unknown direction of transmission.

For this purpose, a variety of techniques are proposed currently to realize satisfactory reception of a desired wave signal.

One of such known techniques is a space diversity receiving system which employs a plurality of antennas and selectively uses the antenna considered to have the best receiving sensitivity with regard to the desired wave signal.

FIG. 11 is a block diagram showing a structure of a conventional antenna device based on a space diversity receiving system.

In the diversity antenna 100 shown in FIG. 11, there are employed two antenna elements ANT1 and ANT2. These antenna elements ANT1 and ANT2 are so arranged that either one antenna element ANT1 or the other antenna element ANT2 that is considered to have a higher receiving sensitivity to the desired wave signal is selectively connected to a receiver 102 via a changeover switch 101. And, after selection of the signal of a desired frequency band in the receiver 102, the signal obtained from the receiver 102 is processed in a predetermined manner in a signal processor 103 and then is outputted therefrom.

However, it is impossible in the diversity antenna 100 of FIG. 11 to perform the control of antenna directional characteristics. That is, since the antenna beam direction cannot be turned to the direction of arrival of a desired wave signal, it is considered impossible to form the antenna beam optimally for reception of the desired wave signal. Therefore, depending on the direction of arrival of the desired wave signal, a sufficiently high receiving sensitivity fails to be attained to raise consequently a problem that some other interference wave signals than the desired wave signal are also received.

In view of the above problem, there is proposed an antenna device termed an adaptive array antenna based on an array antenna system which employs a plurality of transmission/reception lines and utilizes an adaptive signal processing so as to be capable of controlling the antenna directional characteristics.

FIG. 12 is a block diagram showing a structure of an adaptive array antenna.

In the adaptive array antenna 110 of FIG. 12 also, there are employed two antenna elements ANT1 and ANT2.

In this case, the antenna element ANT1 is connected to a receiver 102, wherein radio waves of a desired frequency band are selected and outputted to a signal processor 103. Meanwhile the antenna element ANT2 is connected to a receiver 105, wherein radio waves of a desired frequency band are selected and outputted to the signal processor 103.

In the signal processor 103, the received signals inputted from the receivers 102 and 105 are weighted respectively, and after predetermined signal processing such as combining is executed, the desired wave signal is obtained.

As for the antenna device capable of controlling the antenna directional characteristics, there is further proposed an array antenna device including feed elements therein, such as an Electronically Steerable Passive Array Radiator Antenna (hereinafter referred to as ESPAR antenna) (as disclosed in Patent Document 1).

FIG. 13 is a block diagram showing a structure of such an ESPAR antenna.

In the ESPAR antenna 120 of FIG. 13, there are also employed two antenna elements ANT1 and ANT2. In this case, the antenna element ANT1 is connected to a receiver 102, wherein radio waves of a desired frequency band are selected and outputted to a signal processor 103. Meanwhile, the antenna element ANT2 is connected to a reactance element 106, whose reactance value is controlled by the signal processor 103.

[Patent Document 1]

Japanese Patent Laid-open No. 2001-24431

However, in the adaptive array antenna 110 shown in FIG. 12, there exists the necessity of employing many antenna elements to constitute the required structure for attaining sufficient directional characteristics of the antenna. Therefore, it has been difficult heretofore to adopt such antenna in a mobile communication apparatus, particularly in a mobile terminal device where the number of antenna elements is limited due to physical conditions in installation.

Further regarding the ESPAR antenna 120 shown in FIG. 13, although the directional characteristics thereof may be controlled by providing at least two antenna elements, it also has been necessary to employ many antenna elements for constituting the required structure where sufficient antenna directional characteristics are attainable in a mobile communication apparatus.

SUMMARY OF THE INVENTION

The present invention has been accomplished in view of the problems mentioned above. It is an object of the present invention to provide an antenna device capable of achieving a sufficiently high receiving sensitivity to a desired wave signal with a smaller number of antenna elements.

According to one aspect of the present invention, there is provided an antenna device which includes a plurality of radiation elements, at least one or more reactance elements, and switching means for selectively switching over between one circuit pattern forming a first-type antenna where a predetermined one of the plural radiation elements is used as a feed element, and another circuit pattern forming a second-type antenna where one of the plural radiation elements is used as a feed element while the reactance elements are connected to the other radiation element.

According to another aspect of the present invention, there is provided an antenna device which includes a plurality of radiation elements, at least one or more reactance elements, and switching means for selectively switching over between one circuit pattern forming a first-type antenna where the plural radiation elements are used as feed elements respectively, and another circuit pattern forming a second-type antenna where one of the plural radiation elements is used as a feed element while the reactance elements are connected to the other radiation element.

In the present invention, since the circuit patterns are selectively switchable by the switching means, the first-type antenna and the second-type antenna can be constituted by using a smaller number of radiation elements, hence achieving improvements in the directional characteristics of the antenna device to a desired wave signal.

According to a further aspect of the present invention, there is provided an antenna device which includes a plurality of radiation elements, at least one or more reactance elements, and switching means for selectively switching over among one circuit pattern forming a first-type antenna where the plural radiation elements are used as feed elements respectively, another circuit pattern forming a second-type antenna where one of the plural radiation elements is used as a feed element while the reactance elements are connected to the other radiation element, and a further circuit pattern forming a third-type antenna where a predetermined one of the plural radiation elements is used as a feed element.

The antenna device according to the present invention is capable of selectively switching the circuit patterns by the changeover switching means to thereby form, through a reduced number of radiation elements, first-type and second-type antennas, or first-type, second-type and third-type antennas.

Consequently, if a mobile communication apparatus or the like is equipped with the antenna device of this invention, it becomes possible to achieve, by a small number of radiation elements, remarkable improvements in the directional characteristics of the antenna to any desired wave signal, hence enhancing the antenna sensitivity eventually.

DESCRIPTION OF THE PREFERRED EMBODIMENTS

Hereinafter, some preferred embodiments representing the antenna device of the present invention will be described in detail. Prior to describing the structure of such antenna device, an explanation will be given on how the antenna device of each embodiment is used.

Figure 1:
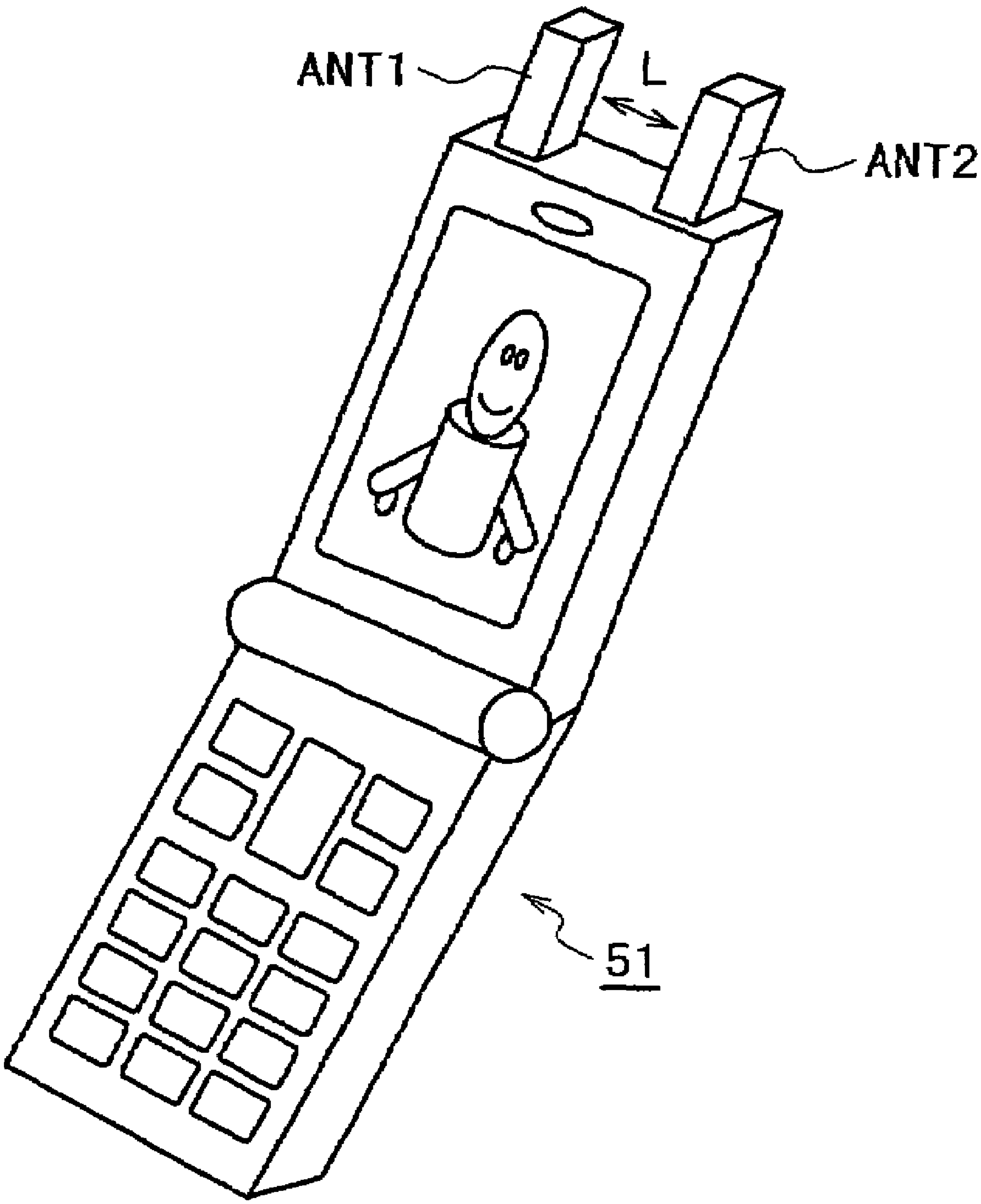
FIG. 1 is an exterior view of a mobile terminal device where an antenna device according to an embodiment is employed.

FIG. 1 is an exterior view of a mobile terminal device equipped with an antenna device as an embodiment.

In the mobile terminal device 51 of FIG. 1, two antenna elements ANT1 and ANT2 are attached to an upper end face thereof.

The distance L between the two antenna elements ANT1 and ANT2 is set so as to correspond to half the wavelength of a radio wave to be transmitted and/or received in the antenna device.

For example, when the antenna device of this embodiment is used for radio wave transmission and/or reception of a 0.8 GHz band allocated to mobile telephones, the distance L between the antenna elements ANT1 and ANT2 is set approximately to 18 cm. In another case of using this antenna device for radio wave transmission and/or reception of a 5 GHz band allocated to a wireless LAN, for example, the distance L between the antenna elements ANT1 and ANT2 is set approximately to 3 cm.

Now, an antenna device according to this embodiment will be described in detail below.

Figures 2, 3:
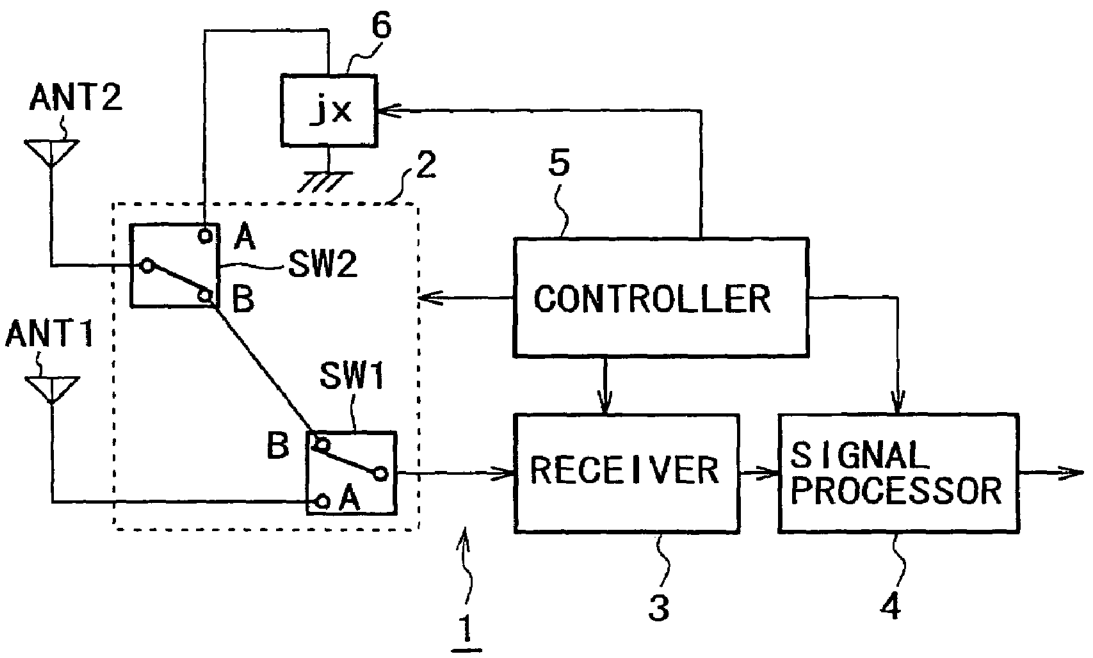
FIG. 2 is a block diagram showing the structure of an antenna device represented as a first embodiment of the present invention.
FIG. 3 is a diagram showing the relationship between antennas types and a changeover switcher in the antenna device of FIG. 2.

FIG. 2 is a block diagram showing the structure of an antenna device represented as a first embodiment.

The antenna device 1 shown in FIG. 2 includes two antenna elements ANT1 and ANT2, a changeover switcher 2, a receiver 3, a signal processor 4, a controller 5 and a reactance element 6.

The changeover switcher 2 has two switches SW1 and SW2 for selectively switching the circuit patterns of the antenna elements ANT1 and ANT2.

Each of these switches may consist of a diode, an FET, or a MEMS (Micro Electro Mechanical System) switch.

In this case, a common terminal of the switch SW1 is connected to the receiver 3. A terminal A of the switch SW1 is connected to the antenna element ANT1, while a terminal B of the switch SW1 is connected to a terminal B of the switch SW2.

Meanwhile a common terminal of the switch SW2 is connected to the antenna element ANT2, and the reactance element 6 is connected to a terminal A of the switch SW2.

The receiver 3 includes, although unshown, an amplifier for amplifying an input signal obtained from the antenna element ANT1, an oscillator for generating an oscillation signal of a predetermined oscillation frequency, and a mixer for mixing the output of the amplifier with the output of the oscillator. The receiver 3 receives an input signal of a desired frequency band and outputs it to the signal processor 4.

The signal processor 4 processes the signal, which has been received and selected in the receiver 3, in a predetermined manner and then outputs the processed signal as a base-band signal.

Although not shown in this diagram, the signal processor 4 has a detection circuit, which detects the field intensity level of the received signal obtained from the receiver 3 and then outputs the detected level to the controller 5.

The controller 5 controls the receiver 3, the signal processor 4 and so forth while controlling the switching action of the changeover switcher 2.

Further, in case the antenna device 1 of this embodiment adopts an ESPAR antenna type, the controller 5 variably controls the reactance value of the reactance element 6.

The reactance element 6 includes, for example, an inductor, a capacitor, a variable capacity diode or the like, wherein the inductance value can be varied by applying a voltage from the controller 5 to the variable capacitance diode of the reactance element 6.

When the reactance element 6 is inductive, the reactance element 6 consists of an extension coil, and the electric length of the antenna element ANT2, which is a non-feed element, becomes greater than that of the antenna element ANT1, which is a feed element, so that the antenna element ANT2 functions as a reflector.

Meanwhile, when the reactance element 6 is capacitive, the reactance element 6 becomes a loading capacitor, and the electric length of the antenna element ANT2, which is a non-feed element, becomes shorter than that of the antenna element ANT1, which is a feed element, so that the antenna element ANT2 functions as a wave guide.

In the antenna device 1 mentioned above, circuit patterns of the two antenna elements ANT1 and ANT2 are selectively switched by the changeover switcher 2, thereby forming two antenna types, i.e., a diversity antenna of a first type and an ESPAR antenna of a second type.

Consequently, three antennas can be constituted in total: i.e., a diversity antenna 1 using the antenna element ANT1 as a feed element; a diversity antenna 2 using the antenna element ANT2 as a feed element; and an ESPAR antenna using the antenna element ANT1 as a feed element while using the antenna element ANT2 as a non-feed element.

FIG. 3 is a diagram showing the relationship between the connection modes of the antennas and the changeover states of the switcher 2 in the antenna device 1 of FIG. 2.

In the case of constituting the diversity antenna 1 that uses the antenna element ANT1 as a feed element, the switching action is controlled by the controller 5 so as to connect the switch SW1 of the changeover switcher 2 to the terminal A and also to connect the switch SW2 to the terminal B, whereby the antenna element ANT1 is connected to the receiver 3 via the changeover switcher 2.

Next, in the case of constituting the diversity antenna 2 that uses the antenna element ANT2 as a feed element, the switching action is controlled by the controller 5 so as to connect the switch SW1 of the changeover switcher 2 to the terminal B and also to connect the switch SW2 to the terminal B, whereby the antenna element ANT2 is connected to the receiver 3 via the changeover switcher 2.

And, in the case of constituting the ESPAR antenna that uses the antenna elements ANT1 and ANT2, the switching action is controlled by the controller 5 so as to connect the switch SW1 of the changeover switcher 2 to the terminal A and also to connect the switch SW2 to the terminal A, whereby the antenna element ANT1 is connected to the receiver 3 via the switch SW1 of the changeover switcher 2 while the antenna element ANT2 is connected to the reactance element 6 via the switch SW2 of the changeover switcher 2.

Thus, in the antenna device 1 of FIG. 2, the switches SW1 and SW2 of the changeover switcher 2 are selectively changed under control of the controller 5, thereby switching the circuit patterns of the two antenna elements ANT1 and ANT2.

Accordingly, the three antennas inclusive of the diversity antenna 1, the diversity antenna 2 and the ESPAR antenna can be constituted by employing two systems, such as a diversity system and an ESPAR system.

Therefore, in the antenna device 1, the field intensity level of the desired wave signal or the data error rate thereof is measured by, for example, the signal processor 4 with respect to the three antenna types such as diversity antenna 1, diversity antenna 2 and ESPAR antenna. And, according to the result of measuring such field intensity level or data error rate, the controller 5 controls the switching action of the switches SW1 and SW2 of the changeover switcher 2 to select thereby one antenna type that finally ensures the optimal reception.

As a result, the degree of freedom regarding the antenna function can be increased to improve consequently the sensitivity of the antenna device 1 to the desired wave signal.

In any conventional ESPAR antenna or adaptive array antenna where radio waves are combined spatially, the distance between the antenna elements is dependent on the wavelength to be utilized. Therefore, in a mobile communication apparatus such as a cellular terminal device, the number of usable antenna elements is limited due to some physical restriction, and consequently it has been impossible heretofore to attain sufficient effects.

In contrast therewith, the antenna device 1 of this embodiment having two antenna elements ANT1 and ANT2 is so constituted that the circuit patterns of these antenna elements ANT1 and ANT2 are selectively changed to realize thereby three antenna circuit patterns based on a diversity antenna system and an ESPAR antenna system, hence improving the antenna sensitivity even in a mobile communication apparatus such as a cellular terminal device where the number of attachable antenna elements is limited.

Figures 4, 5:
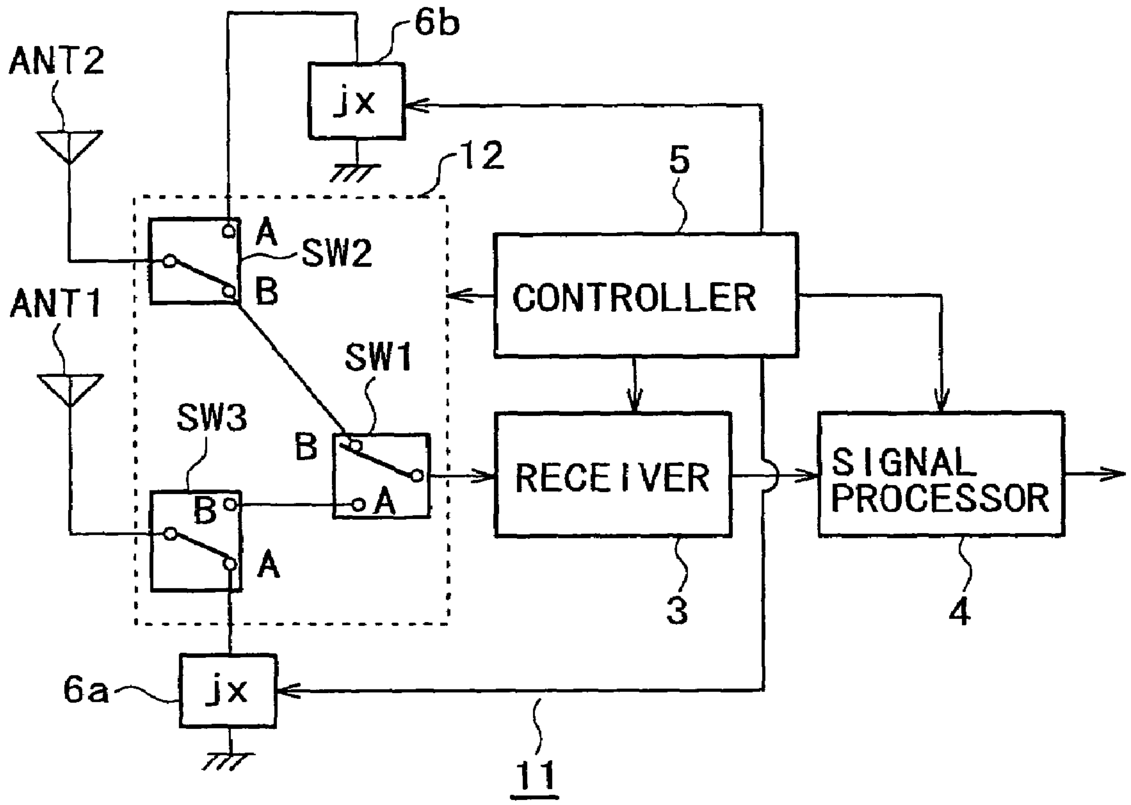
FIG. 4 is a block diagram showing the structure of an antenna device represented as a second embodiment of the invention.
FIG. 5 is a diagram showing the relationship between antenna types and a changeover switcher in the antenna device of FIG. 4.

Next, FIG. 4 is a block diagram showing the structure of another antenna device represented as a second embodiment. In this diagram, any component parts corresponding to those in the aforementioned antenna device of FIG. 2 are denoted by the same reference numerals or symbols, and a detailed explanation thereof will be omitted below.

In the antenna device 11 of FIG. 4, the changeover switcher is structurally different from that in the antenna device 1 shown in FIG. 2. And, another difference is that two reactance elements 6*a* and 6*b* are included in this embodiment, although merely one reactance element 6 is included in the antenna device 1 of FIG. 2.

The changeover switcher 12 in this case includes three switches SW1, SW2 and SW3 for selectively switching circuit patterns of antenna elements ANT1 and ANT2, wherein a common terminal of the switch SW1 is connected to a receiver 3. A terminal A of the switch SW1 is connected to a terminal B of the switch SW3, and a terminal B of the switch SW1 is connected to a terminal B of the switch SW2.

A common terminal of the switch SW2 is connected to the antenna element ANT2, and a terminal A of the switch SW2 is connected to the reactance element 6*b*.

A common terminal of the switch SW3 is connected to the antenna element ANT1, and a terminal A of the switch SW3 is connected to the reactance element 6*a*.

In this antenna device 11, the circuit patterns of the two antenna elements ANT1 and ANT2 are selectively switched by the changeover switcher 12, hence forming the antennas of two systems, i.e., the diversity antenna of a first type and the ESPAR antenna of a second type, as in the aforementioned antenna device of FIG. 2.

In this case, due to the provision of two reactance elements, it becomes possible to realize a total of four antenna types inclusive of a diversity antenna 1, a diversity antenna 2, an ESPAR antenna 1 using the antenna element ANT1 as a feed element while using the antenna element ANT2 as a non-feed element, and another ESPAR antenna 2 using the antenna element ANT2 as a feed element while using the antenna element ANT1 as a non-feed element.

FIG. 5 is a diagram showing the relationship between the connection modes of the antennas and the changeover states of the switcher 12 in the antenna device 11 of FIG. 4.

First, when a diversity antenna 1 is to be constituted by using the antenna element ANT1 as a feed element, the controller 5 controls the switching action for connecting the switch SW1 of the changeover switcher 12 to the terminal A, the switch SW2 to the terminal B, and the switch SW3 to the terminal B respectively, whereby the antenna element ANT1 is connected to the receiver 3 via the changeover switcher 12.

When a diversity antenna 2 is to be constituted by using the antenna element ANT2 as a feed element, the controller 5 controls the switching action for connecting the entire switches SW1, SW2 and SW3 of the changeover switcher 12 to the terminal B respectively, whereby the antenna element ANT2 is connected to the receiver 3 via the changeover switcher 12.

When an ESPAR antenna 1 is to be constituted by using the antenna elements ANT1 and ANT2, the controller 5 controls the switching action for connecting the switches SW1 and SW2 of the changeover switcher 12 to the terminal A while connecting the switch SW3 to the terminal B, whereby the antenna element ANT1 is connected to the receiver 3 via the switch SW3 to the switch SW1 in this order while the antenna element ANT2 is connected to the reactance element 6*b* via the switch SW2 of the changeover switcher 12.

And, when an ESPAR antenna 2 is to be constituted, the controller 5 controls the switching action for connecting the switches SW1 and SW2 of the changeover switcher 12 to the terminal B while connecting the switch SW3 to the terminal A, whereby the antenna element ANT2 is connected to the receiver 3 via the switch SW2 to the switch SW1 in this order while the antenna element ANT1 is connected to the reactance element 6*a* via the switch SW3 of the changeover switcher 12.

Thus, in the antenna device 11 of FIG. 4, the controller 5 controls the switching action for selectively connecting the switches SW1 through SW3 of the changeover switcher 12 to consequently switch the circuit patterns of the two antenna elements ANT1 and ANT2.

As a result, it becomes possible to constitute a total of four antennas inclusive of diversity antenna 1, diversity antenna 2, ESPAR antenna 1 and ESPAR antenna 2 in accordance with the two systems, i.e., the diversity system and the ESPAR system.

Therefore, in the case where the antenna device 11 is constituted as shown in FIG. 4, four antennas can be formed by employing the two antenna systems, so that the sensitivity to any desired wave signal can be more improved than in the aforementioned antenna device 1 of FIG. 2.

Figures 6, 7:
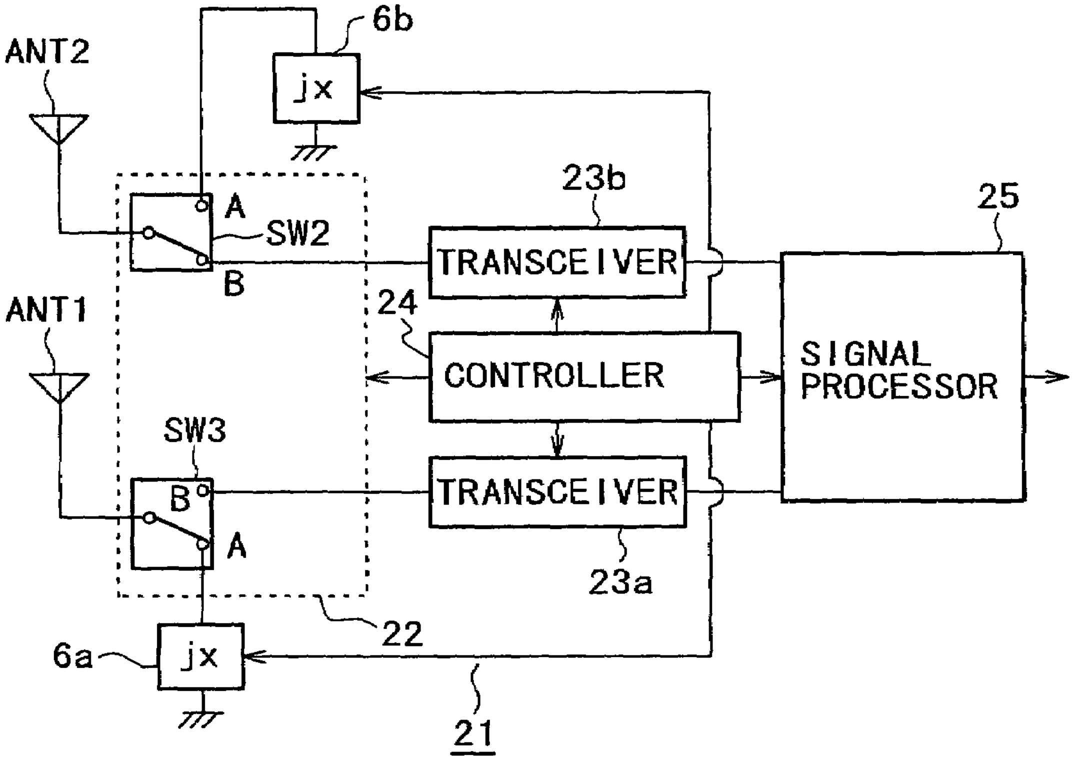
FIG. 6 is a block diagram showing the structure of an antenna device represented as a third embodiment of the invention.
FIG. 7 is a diagram showing the relationship between antenna types and a changeover switcher in the antenna device of FIG. 6.

FIG. 6 is a block diagram showing the structure of another antenna device represented as a third embodiment. In this diagram, any component parts corresponding to those in the aforementioned antenna device of FIG. 2 are denoted by the same reference numerals or symbols, and a detailed explanation thereof will be omitted below.

The antenna device 21 shown in FIG. 6 includes antenna elements ANT1 and ANT2, reactance elements 6*a* and 6*b*, a changeover switcher 22, transceivers 23*a* and 23*b*, a controller 24 and a signal processor 25.

The changeover switcher 22 consists of two switches SW2 and SW3 for selectively switching the circuit patterns of the antenna elements ANT1 and ANT2.

In this case, a common terminal of the switch SW2 is connected to the antenna element ANT2, and a terminal A of the switch SW2 is connected to the reactance element 6*b*, while a terminal B thereof is connected to the transceiver 23*b*.

A common terminal of the switch SW3 is connected to the antenna element ANT1, and a terminal A thereof is connected to the reactance element 6*a*, while a terminal B thereof is connected to the transceiver 23*a*.

Each of the transceivers 23*a* and 23*b* includes, for example, an amplifier for amplifying an input signal obtained from the antenna element ANT1 or ANT2, an oscillator for outputting an oscillation signal of a predetermined oscillation frequency, and a mixer for mixing the output of the amplifier with the output of the oscillator, wherein a received signal of a desired frequency band out of the radio waves obtained from the antenna element ANT1 or ANT2 is outputted to the signal processor 25.

In the signal processor 25, the received signal selected in the transceivers 23*a* and 23*b* is processed in a predetermined manner and then is outputted therefrom.

Figure 10:
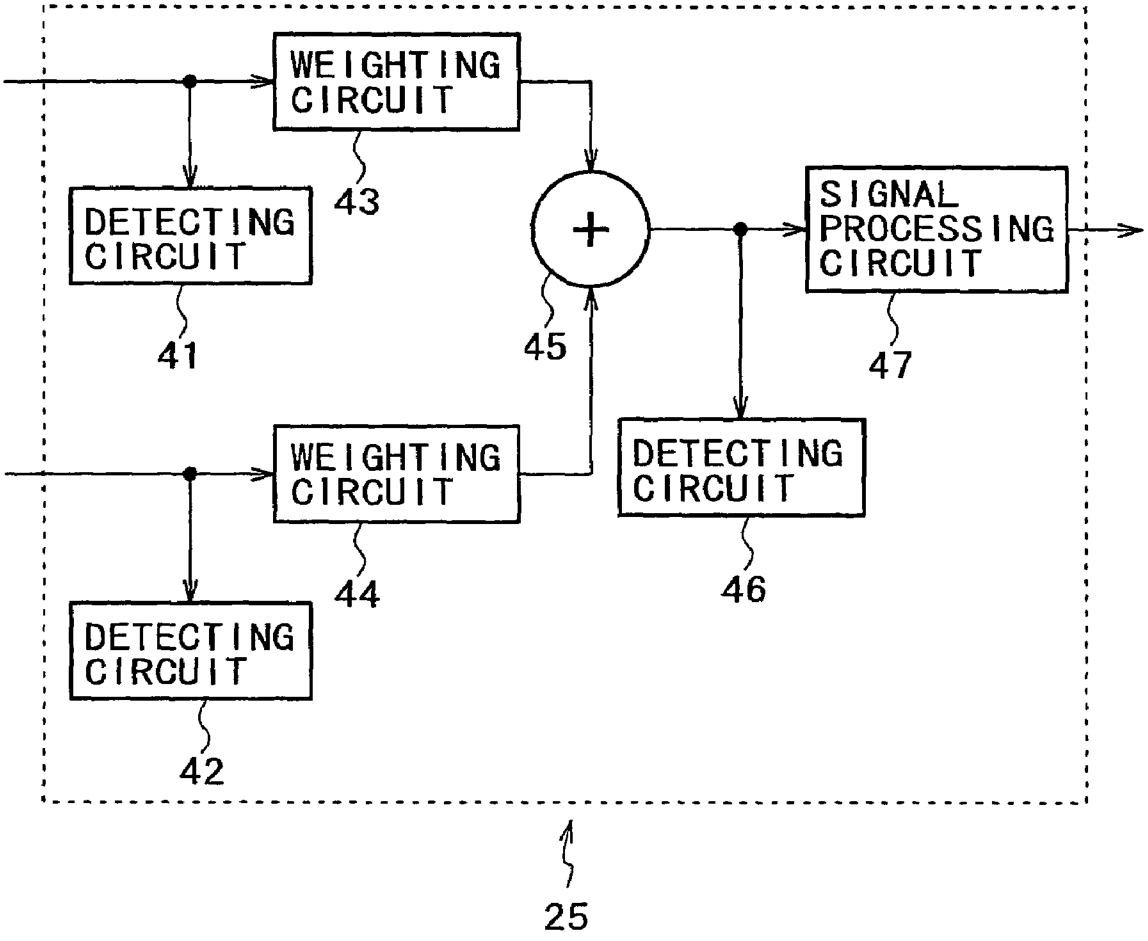
FIG. 10 is a block diagram showing an exemplary circuit configuration of a signal processor.
Figure 11:
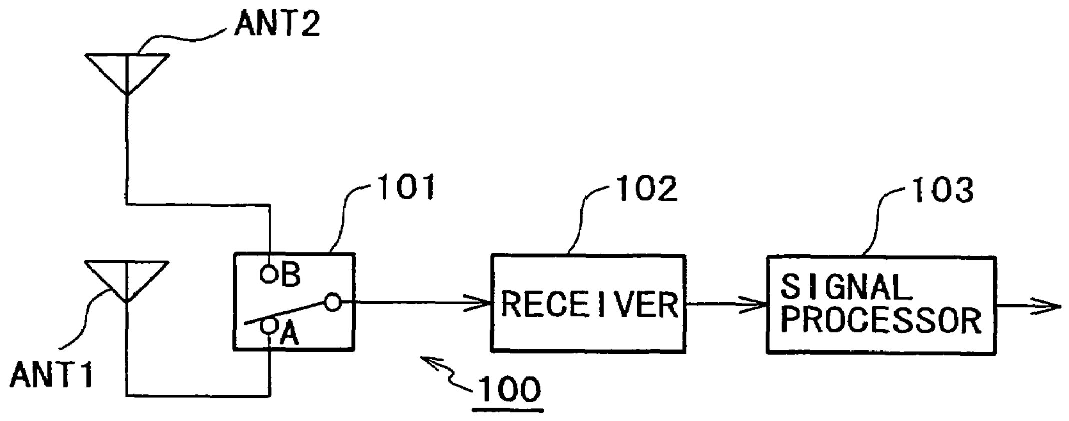
FIG. 11 is a block diagram showing the structure of a conventional antenna device.
Figure 12:
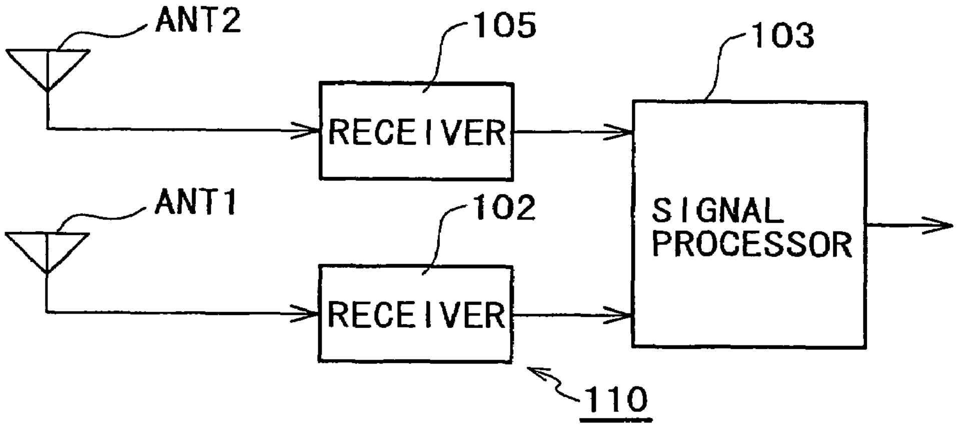
FIG. 12 is a block diagram showing the structure of another conventional antenna device.
Figure 13:
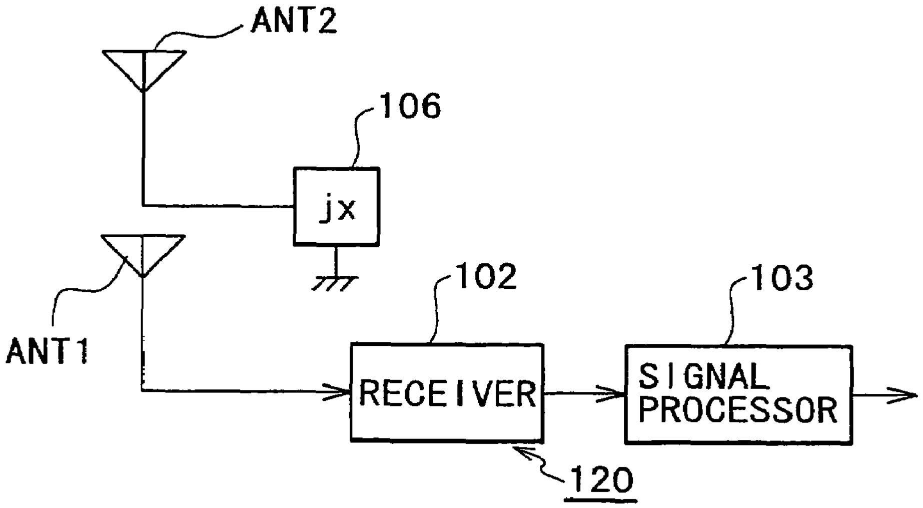
FIG. 13 is a block diagram showing the structure of a further conventional antenna device.

FIG. 10 is a diagram showing an internal structural example of the signal processor 25.

The signal processor 25 shown in FIG. 10 includes a weighting circuit 43 for weighting the signal obtained from the transceiver 23*a* when an adaptive array antenna is formed by the antenna device 21, a weighting circuit 44 for weighting the signal obtained from the transceiver 23*b*, and an adder 45 for mutually combining the outputs of the weighting circuits 43 and 44.

And, the combined signal obtained from the adder 45 is processed in a predetermined manner by a signal processing circuit 47, so that a base-band signal is outputted from the signal processing circuit 47.

Detecting circuits 41 and 42 are provided for detecting the field intensity levels of the received signals inputted from the transceivers 23*a* and 23*b* when an ESPAR antenna is constituted in the antenna device 21. And, another detecting circuit 46 is provided for detecting the field intensity level of the received signal combined when an adaptive array antenna is constituted in the antenna device 21.

A controller 24 controls the transceivers 23*a* and 23*b*, the signal processor 25 and so forth while controlling the switching action of the changeover switcher 22.

The controller 24 is further capable of variably controlling the reactance of the reactance element 6 when an ESPAR antenna is formed in the antenna device 21.

In this antenna device 21, the circuit patterns of the two antenna elements ANT1 and ANT2 are selectively switched by the changeover switcher 22 to realize thereby three connection types, such as an ESPAR antenna 1 based on the aforementioned ESPAR antenna system, an ESPAR antenna 2, and an array antenna using the two transceivers 23*a* and 23*b*, i.e., an adaptive array antenna.

FIG. 7 is a diagram showing the relationship between the connection modes of the antennas and the changeover states of the switcher in the antenna device of FIG. 6.

First, when an ESPAR antenna 1 is to be constituted by using the antenna elements ANT1 and ANT2, the controller 24 controls the switching action for connecting the switch SW2 of the changeover switcher 22 to the terminal A and the switch SW3 thereof to the terminal B, respectively, whereby the antenna element ANT1 is connected to the transceiver 23*a* via the switch SW3 of the switcher 22 and the antenna element ANT2 is connected to the reactance element 6*b* via the switch SW2 of the changeover switcher 22.

When an ESPAR antenna 2 is to be constituted, the controller 24 controls the switching action for connecting the switch SW2 of the changeover switcher 22 to the terminal B and the switch SW3 thereof to the terminal A, respectively, whereby the antenna element ANT2 is connected to the transceiver 23*b* via the switch SW2 of the changeover switcher 22, while the antenna element ANT1 is connected to the reactance element 6*a* via the switch SW3 of the changeover switcher 22.

When an adaptive array antenna is to be constituted by using the antenna elements ANT1 and ANT2, the controller 24 controls the switching action for connecting the switches SW2 and SW3 of the changeover switcher 22 to the terminal B.

Consequently, the antenna element ANT1 is connected to the transceiver 23*a* via the switch SW3 of the changeover switcher 22, while the antenna element ANT2 is connected to the transceiver 23*b* via the switch SW2 of the changeover switcher 22.

Thus, in the antenna device 21 of FIG. 6, the controller 24 controls the switching action for selectively connecting the switches SW2 and SW3 of the changeover switcher 22 to switch thereby the circuit patterns of the two antenna elements ANT1 and ANT2.

As a result, it becomes possible to constitute three antennas inclusive of ESPAR antenna 1, ESPAR antenna 2 and array antenna in conformity with the two systems, i.e., the ESPAR antenna system and the adaptive array antenna system.

Therefore, in case the antenna device 21 is constituted as shown in FIG. 6, the degree of freedom regarding the antenna function can be increased in comparison with the conventional device. That is, in the antenna device 21 also, it becomes possible to form three antennas by employing the two antenna elements ANT1 and ANT2 similarly to the aforementioned antenna device 1 of FIG. 2, so that the sensitivity of the antenna device 21 to any desired wave signal can be thus improved.

Figures 8, 9:
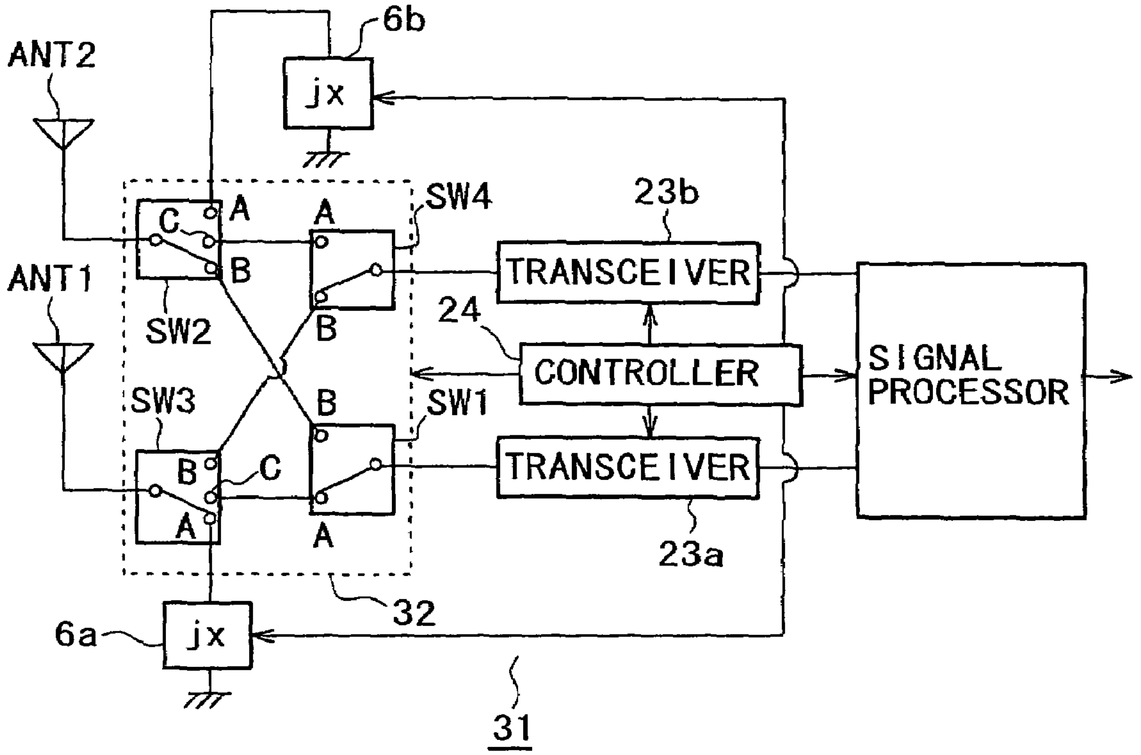
FIG. 8 is a block diagram showing the structure of an antenna device represented as a fourth embodiment of the invention.
FIG. 9 is a diagram showing the relationship between antenna types and a changeover switcher in the antenna device of FIG. 8.

FIG. 8 is a block diagram showing the structure of another antenna device represented as a fourth embodiment. In this diagram, any component parts corresponding to those in the aforementioned antenna devices of FIGS. 4 and 6 are denoted by the same reference numerals or symbols, and a detailed explanation thereof will be omitted below.

The antenna device 31 shown in FIG. 8 includes antenna elements ANT1 and ANT2, reactance elements 6*a* and 6*b*, a changeover switcher 32, transceivers 23*a* and 23*b*, a controller 24 and a signal processor 25.

The changeover switcher 32 consists of four switches SW1, SW2, SW3 and SW4 for selectively switching the circuit patterns of the antenna elements ANT1 and ANT2.

In this case, each of the switches SW1 and SW4 is a double-pole switch, and each of the switches SW2 and SW3 is a triple-pole switch.

A common terminal of the switch SW1 is connected to the transceiver 23*a*; a terminal A of the switch SW1 is connected to a terminal C of the switch SW3, and a terminal B of the switch SW1 is connected to a terminal B of the switch SW2.

A common terminal of the switch SW2 is connected to the antenna element ANT2; a terminal A of the switch SW2 is connected to the reactance element 6*b*; a terminal B of the switch SW2 is connected to a terminal B of the switch SW1; and a terminal C of the switch SW2 is connected to a terminal A of the switch SW4.

A common terminal of the switch SW3 is connected to the antenna element ANT1; a terminal A of the switch SW3 is connected to the reactance element 6*a*; a terminal B of the switch SW3 is connected to a terminal B of the switch SW4; and a terminal C of the switch SW3 is connected to the terminal A of the switch SW1.

Further, a common terminal of the switch SW4 is connected to the transceiver 23*b*; a terminal A of the switch SW4 is connected to the terminal C of the switch SW2; and the terminal B of the switch SW1 is connected to the terminal B of the switch SW3.

Therefore, in this antenna device 31, it becomes possible to constitute a total of five antennas, such as the aforementioned diversity antenna 1, diversity antenna 2, ESPAR antenna 1, ESPAR antenna 2 and array antenna, by actuating the changeover switcher 32 to selectively switch the circuit patterns of the two antenna elements ANT1 and ANT2.

FIG. 9 is a diagram showing the relationship between the connection modes of the antennas and the changeover states of the switcher in the antenna device of FIG. 8.

First, when a diversity antenna 1 is to be constituted by using the antenna element ANT1 as a feed element, the controller 24 controls the switching action for connecting the switch SW1 of the changeover switcher 32 to the terminal A, the switch SW2 thereof to the terminal B, and the switch SW3 thereof to the terminal C respectively.

As a result, merely the antenna element ANT1 alone can be connected to the transceiver 23*a* via the changeover switcher 32. In this case, the switch SW4 may be connected to either the terminal A or B.

When a diversity antenna 2 is to be constituted by using the antenna element ANT2 as a feed element, the controller 24 controls the switching action for connecting the switches SW1 and SW2 of the changeover switcher 32 to the terminal B and the switch SW3 thereof to the terminal C, respectively, whereby the antenna element ANT2 alone can be connected to the transceiver 23*a* via the changeover switcher 32. In this case also, the switch SW4 may be connected to either the terminal A or B.

When an ESPAR antenna 1 is to be constituted by using the antenna elements ANT1 and ANT2, the controller 24 controls the switching action for connecting the switches SW1 and SW2 of the changeover switcher 32 to the terminal A and the switch SW3 thereof to the terminal B, respectively, whereby the antenna element ANT1 is connected to the transceiver 23*a* via the changeover switcher 32, and the antenna element ANT2 is connected to the reactance element 6*b* via the changeover switcher 32. In this case also, the switch SW4 may be connected to either the terminal A or B.

When an ESPAR antenna 2 is to be constituted, the controller 24 controls the switching action for connecting the switch SW2 of the changeover switcher 32 to the terminal C and the switches SW3 and SW4 to the terminal A, respectively, whereby the antenna element ANT2 is connected to the transceiver 23*a* via the changeover switcher 32, and the antenna element ANT1 is connected to the reactance element 6*a* via the changeover switcher 32. In this case, the switch SW1 may be connected to either the terminal A or B.

And when an adaptive array antenna is to be constituted by using the antenna elements ANT1 and ANT2, the controller 24 controls the switching action for connecting the switches SW1 and SW4 of the changeover switcher 32 to the terminal A and the switches SW2 and SW3 to the terminal C, respectively, whereby the antenna element ANT1 is connected to the transceiver 23*a* via the changeover switcher 32, while the antenna element ANT2 is connected to the transceiver 23*b* via the changeover switcher 32.

Thus, in the antenna device 31 of FIG. 8, the controller 24 controls the switching action for selectively connecting the switches SW1 through SW4 2 of the changeover switcher 32 to switch thereby the circuit patterns of the two antenna elements ANT1 and ANT2. As a result, it becomes possible to constitute a total of five antennas inclusive of diversity antenna 1, diversity antenna 2, ESPAR antenna 1, ESPAR antenna 2 and array antenna in conformity with the three antenna systems, i.e., the diversity antenna system, the ESPAR antenna system and the adaptive array antenna system.

Therefore, in case the antenna device 31 is constituted as shown in FIG. 8, the degree of freedom regarding the antenna function can further be increased to improve the sensitivity of the antenna device 31 to any desired wave signal.

Although the antenna device according to each of the above embodiments has been explained with respect to an exemplary case of employing two antenna elements, each example is merely illustrative, and it is a matter of course that more than two antenna elements may be employed for constituting the antenna device.

For example, if three antenna elements are used to constitute the antenna device, a maximum of ten combinations of antennas can be formed to realize further improvements in the directional characteristics of the antenna device to any desired wave signal, hence enhancing the antenna sensitivity eventually.

Moreover, the combinations of the antenna systems described above with regard to the preferred embodiments are merely illustrative, and it is also possible to constitute the antenna device in such a manner that the circuit patterns can be switched by the changeover switcher to, for example, a diversity antenna system and an adaptive array antenna system.

Further, the preferred embodiments represent some examples of constituting an antenna device for a wireless LAN or a mobile telephone. However, such embodiments are merely illustrative, and the present invention is usable for television broadcasting as well.

While the preferred embodiments of the present invention have been described using specific embodiments, such description is for illustrative purposes only, and it is to be understood that changes and variations may be made without departing from the spirit or scope of the appended claims.

What is claimed is:

1. An antenna device comprising:

a plurality of radiation elements;

at least one or more reactance elements; and switching means for selectively switching over between one circuit pattern forming a first-type antenna where a predetermined one of said plural radiation elements is used as a feed element, and another circuit pattern forming a second-type antenna where one of said plural radiation elements is used as a feed element while said reactance elements are connected to the other radiation element, wherein the distance between one radiation element used as a feed element and the other radiation element in said second-type antenna is set in conformity with the wavelength of a desired radio wave to be received.

2. The antenna device according to claim 1, wherein the circuit pattern of said second-type antenna is so formed that said reactance elements are connected respectively to the radiation element other than the feed element.

3. An antenna device comprising:

a plurality of radiation elements;

at least one or more reactance elements; and switching means for selectively switching over between one circuit pattern forming a first-type antenna where said plural radiation elements are used as feed elements respectively, and another circuit pattern forming a second-type antenna where one of said plural radiation elements is used as a feed element while said reactance elements are connected to the other radiation element, wherein the distance between one radiation element used as a feed element and the other radiation element in said second-type antenna is set in conformity with the wavelength of a desired radio wave to be received.

4. An antenna device comprising:

a plurality of radiation elements;

at least one or more reactance elements; and switching means for selectively switching over among one circuit pattern forming a first-type antenna where said plural radiation elements are used as feed elements respectively, another circuit pattern forming a second-type antenna where one of said plural radiation elements is used as a feed element while said reactance elements are connected to the other radiation element, and a further circuit pattern forming a third-type antenna where a predetermined one of said plural radiation elements is used as a feed element, wherein the distance between one radiation element used as a feed element and the other radiation element in said third-type antenna is set in conformity with the wavelength of a desired radio wave to be received.

5. An antenna device comprising:

a plurality of radiation elements;

at least one or more reactance elements;

a controller which controls the reactance of the reactance elements; and switching means for selectively switching over between one circuit pattern forming a first-type antenna where a predetermined one of said plural radiation elements is used as a feed element, and another circuit pattern forming a second-type antenna where one of said plural radiation elements is used as a feed element while said reactance elements are connected to the other radiation element, and wherein the distance between one radiation element used as a feed element and the other radiation element in said second-type antenna is set in conformity with the wavelength of a desired radio wave to be received.

6. The antenna device according to claim 5, wherein the circuit pattern of said second-type antenna is so formed that said reactance elements are connected respectively to the radiation element other than the feed element.

7. An antenna device comprising:

a plurality of radiation elements;

at least one or more reactance elements;

a controller which controls the reactance of the reactance elements; and switching means for selectively switching over between one circuit pattern forming a first-type antenna where said plural radiation elements are used as feed elements respectively, and another circuit pattern forming a second-type antenna where one of said plural radiation elements is used as a feed element while said reactance elements are connected to the other radiation element, and wherein the distance between one radiation element used as a feed element and the other radiation element in said second-type antenna is set in conformity with the wavelength of a desired radio wave to be received.

8. An antenna device comprising:

a plurality of radiation elements;

at least one or more reactance elements;

a controller which controls the reactance of the reactance elements; and switching means for selectively switching over among one circuit pattern forming a first-type antenna where said plural radiation elements are used as feed elements respectively, another circuit pattern forming a second-type antenna where one of said plural radiation elements is used as a feed element while said reactance elements are connected to the other radiation element, and a further circuit pattern forming a third-type antenna where a predetermined one of said plural radiation elements is used as a feed element, and wherein the distance between one radiation element used as a feed element and the other radiation element in said third-type antenna is set in conformity with the wavelength of a desired radio wave to be received.

* * * * *